United States Patent [19]

Yoshida et al.

[11] 4,124,327
[45] Nov. 7, 1978

[54] SPINDLE INERTIA CHANGING APPARATUS FOR MACHINING CENTER

[75] Inventors: Motohiko Yoshida; Nobuyuki Katagiri, both of Niwa, Japan

[73] Assignee: Kabushiki Kaisha Yamazaki Tekkosho, NIwa, Japan

[21] Appl. No.: 782,786

[22] Filed: Mar. 30, 1977

[30] Foreign Application Priority Data

Apr. 13, 1976 [JP] Japan .................... 51-42158

[51] Int. Cl.² ..................... B23Q 5/22; G05G 3/00
[52] U.S. Cl. ..................... 408/140; 74/572; 90/11 A; 408/124
[58] Field of Search .......... 74/572; 192/85 A, 85 CA, 192/85 AA; 90/11 R, 11 A; 408/124, 140; 173/163; 10/129 R

[56] References Cited

U.S. PATENT DOCUMENTS

| | | | |
|---|---|---|---|
| 942,065 | 12/1909 | Grebel | 192/85 A |
| 1,254,951 | 1/1918 | Ward | 192/85 A |
| 1,703,991 | 3/1929 | Day | 74/572 |
| 2,464,975 | 3/1949 | Gibbs | 192/85 A |
| 2,697,965 | 12/1954 | Armitage | 74/572 X |
| 3,061,849 | 11/1962 | Barbeau | 74/572 X |
| 4,050,557 | 9/1977 | Beneke | 74/572 X |

Primary Examiner—N. P. Godici

[57] ABSTRACT

The present invention relates to an improvement in a mechanism wherein a flywheel which is idly mounted on a spindle of a machining center is easily and speedily connected with or detached from the spindle by a clutch which is fitted on the spindle adjacent to the flywheel for promoting the cutting efficiency by providing spindle inertia of two kinds; one kind for heavy cutting and another for light cutting respectively.

6 Claims, 2 Drawing Figures

SPINDLE INERTIA CHANGING APPARATUS FOR MACHINING CENTER

BACKGROUND OF THE INVENTION

The present invention relates to means for changing the spindle inertia of the spindle of a machining center to provide the proper inertia for heavy cutting or the light cutting, the change being achieved by a transfer means which is provided internally of the apparatus.

Formerly, in a conventional machining center, the operation has been inefficient because the conventional type of machining center has no flywheel and, moreover, it has been operated with the same spindle system inertia not only for heavy cutting such as milling work but also for light cutting such as tapping work.

BRIEF SUMMARY OF THE INVENTION

It is accordingly a first object of the present invention to provide means to carry out in an efficient manner either heavy cutting or light cutting by the use of the same machining center having the spindle inertia suitable for a cutting load for either type of cutting.

A second object of the present invention is to provide means for considerably expanding the range of loads which can be handled by the machine with a simplified apparatus and operation, the means including apparatus for early connecting and detaching the flywheel from the spindle, thereby improving the economy of operation of the machining center.

A third object of the present invention is to lengthen the life of the machining center by insuring that no unreasonable load is imposed thereon changing the spindle inertia of the said machining center to an inertia which is proper for the cutting load.

To achive the foregoing objects the present invention provides an apparatus wherein a tapered concave conical clutch surface is formed on one side of the flywheel which is rotatably and idly mounted on the spindle and, on the spindle on the side of the foregoing tapered concave surface and adjacent to the said flywheel is mounted a conical clutch body provided with a tapered convex clutch surface corresponding to the foregoing tapered concave surface, and the conical clutch body is freely slidable in the axial direction of the spindle and is movable into and out of engagement with the tapered concave surface of the flywheel by a hydraulic, pneumatic, mechanical or magnetic means.

Other objects, characteristics, and advantages of the present invention will be understood from the following description taken together with the accompanying drawings.

DETAILED DESCRIPTION OF THE INVENTION

Figure 1:
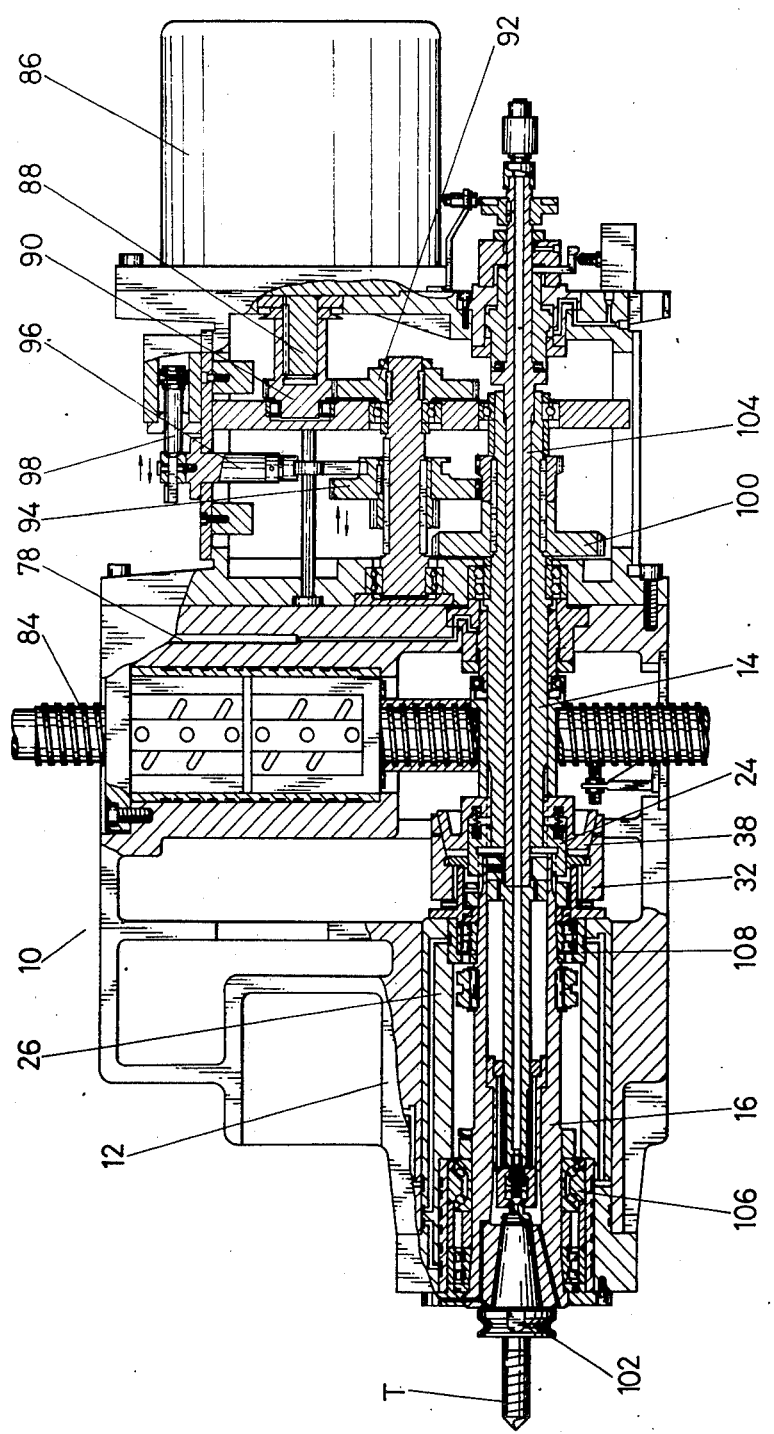
FIG. 1 is a longitudinal sectional view of the spindle section of a machining center showing a practical embodiment of the present invention in which the spindle on which the flywheel and the clutch are mounted and the drive motor are connected by a reduction gear.
Figure 2:
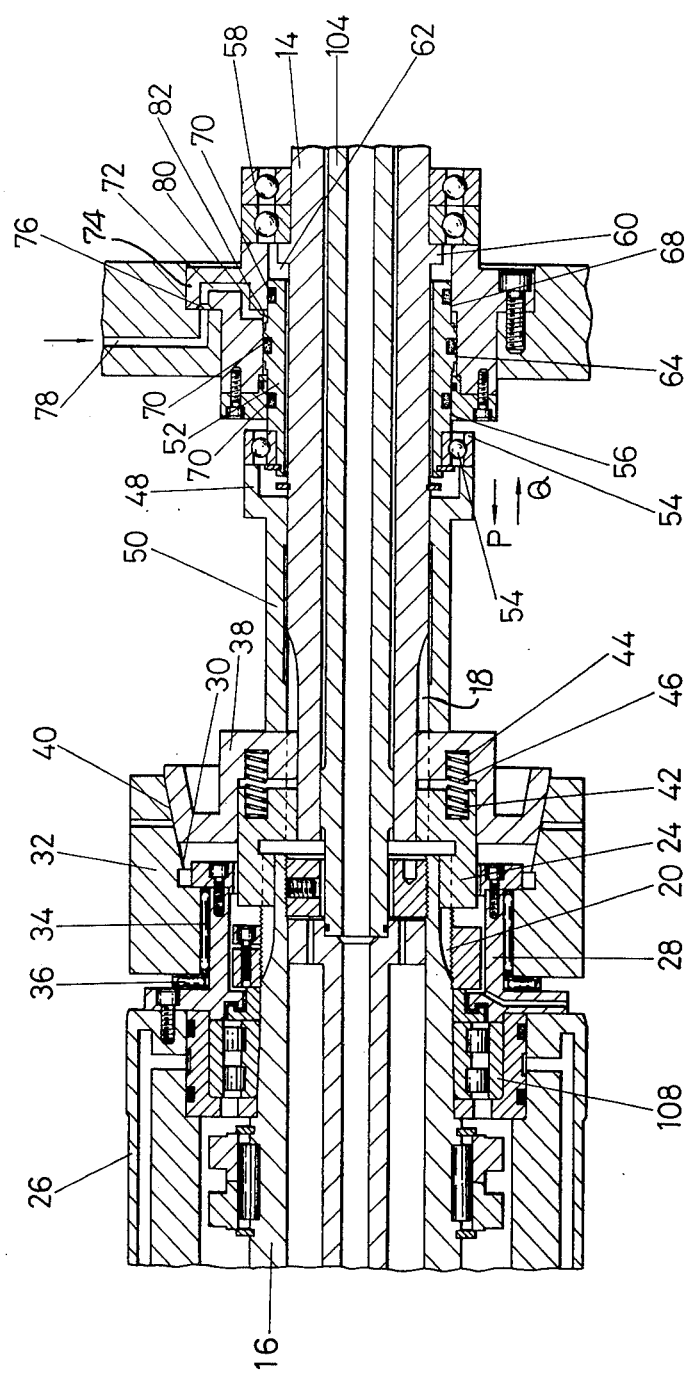
FIG. 2 is an enlarged sectional view showing the manner of the attachment of the flywheel and the clutch to the spindle.

In the present invention the major elements of the transfer means for changing the spindle inertia of the machining center comprise a conical clutch body slidably mounted the spindle of the said machining center, a flywheel idly mounted on the spindle and which is engaged with and disengaged from the foregoing conical clutch body, and the sliding drive means for sliding the said conical clutch body in the axial direction of the spindle. As shown in FIG. 1, a main spindle 14 and a tip spindle 16 axially aligned therewith are rotatably, longitudinally and horizontally mounted in a head 12 of the machining center 10 and are, as shown in FIGS. 1 and 2, connected by a coupling 24 engaged with splines 18 and 20; at the opposing end parts of the main and tip spindles. A flanged ring 28 is fixed to the end surface of an outer case 26 of the tip spindle 16 with the end part of the said tip spindle 16 loosely extending through the center of the said outer case 26, and, on the outside circumferential surface of the foregoing flanged ring base 28 is a rotatably mounted flywheel 32. The flywheel is freely rotatable on needle bearings 34 and needle thrust bearings 36 and has a tapered concave conical clutch surface 30 formed therein and opening towards the main spindle 14.

Further, a conical clutch body 38 is slidably mounted on the foregoing main spindle 14 for movement in the axial direction and has on the end facing the coupling 24 a tapered convex surface 40 which is moveable into engagement with and detachable from the tapered concave conical clutch surface 30 on the flywheel 32. Compression springs 46 are mounted within spring holding holes 42 and 44 which are provided in a plurality of positions opposed to the coupling 24 and the said conical clutch body 38, so that the conical clutch body 38 is always pushed towards the main spindle 14 by a resilient force.

A spacer 50 is loosely mounted on the main spindle 14 and at the base part (right end in drawing) has a step 48 and at the tip end (left end in drawing) touches the said conical clutch body 38. The step 48 engages the end surface of an outer case 56 of a ball bearing 54 which is mounted at the tip end of a sliding piece 52 slidably mounted on the main spindle for movement in the axial direction of the main spindle 14. A gap 62 is provided between the rear end surface of the sliding piece 52 and the front end surface of a flange 60 which projects radially from the main spindle 14 to stop a ball bearing 58 which supports the main spindle 14.

A wide ring holding portion 64 projects radially at the center of the said sliding piece 52, and an O-ring 70 is fitted in the outer circumferential surface of the foregoing ring bank 64 and to the outer circumferential surface of lower portions 66 and 68 which are positioned in front and behind the said ring holding portion. Around the outer circumferential surface of the said sliding piece 52 there is fixedly mounted a cylinder 74 within which an oil passage 72 is provided and the inlet 76 of the oil passage 72 is connected with a control valve of a source of hydraulic fluid under pressure (not illustrated) through an oil tube 78. The passage opens into a small space 82 which is formed by the outer circumferential surface at the back of the sliding piece 52 and the inner circumferential surface of the cylinder 74.

The spindle inertia changing apparatus of the present invention is composed of the foregoing elements which have been described in detail. The chief components of the spindle portion of the machine center other than the foregoing elements as shown in FIGS. 1 and 2 are a lifting screw 84 to elevate and lower the machining head 12, a drive motor 86 for the spindle having a motor shaft 88 connected to a driven gear 100 on the main spindle by a drive gear 90 through a reduction gear 92 and a speed changing gear 94 under the control of a speed changing lever 96 driven by a speed changing cylinder 98. An arbor 102 is provided for attaching a tool, and a tension rod 104 is provided for tightening the arbor. Bearings 106 and 108 support the tip spindle 16.

An operation, when a desired cutting tool has been mounted in the arbor 102 disposed at the tip end of the tip spindle 16 of the machining center 10 and the head 12 in which the main and the tip spindles 14 and 16 are horizontally arranged is elevated or lowered by the lifting screw 84 to fix the foregoing cutting tool at a desired cutting height, the speed changing gear 94 is rotated by the motor shaft 88 through the drive gear 90 and the reduction gear 92 from the drive motor 86, and the foregoing speed changing gear 94 is moved in the direction of the arrow P or Q by the speed changing lever 96 by the actuation of the speed changing cylinder 98 to engage with the driven gear 100 fixed to the main spindle 14 in either a low speed engagement or a high speed engagement, so that the main spindle 14 can rotate at either a low speed or a high speed. The tip spindle 16 being connected to the main spindle by the coupling 24, it rotates either at the desired low speed or the desired high speed to drive the cutting tool T attached via the arbor 102 thereto.

For carrying out a heavy cutting operation such as milling work, the rotation of the basic spindle should be at a low speed and the spindle inertia should be great. To achieve this, the flywheel 32 freely rotatably mounted on the outer case 26 of the tip spindle 16 is connected with the spindle system. High pressure hydraulic fluid is directed from the oil passage 72 of the said cylinder 74 into the small space 82 between by the sliding piece 52 and the cylinder 74 via the oil tube 78 under the control of a valve in the hydraulic fluid oil source for the machining center actuated under the instruction of the control means (not illustrated), and the sliding piece 52 slides along the main spindle 14 in the direction of the arrow P to move the ball bearing 54 at the tip end of the sliding piece 52 in the direction of the arrow P also, whereby the the spacer 50 which is contacted by the outer case 56 of the ball bearing 54 at the read end of the step 48 thereof and which is loosely mounted on the main spindle 14 is also pushed in the direction of the arrow P. Thus, in turn pushes the conical clutch body 38 fitted on the spline 18 at the tip end of the main spindle 14 against the resilient force of the compression springs 46 resiliently disposed between the coupling 24 and the said conical clutch body 38 in the direction of the arrow P and, while the said conical clutch body 38 is rotating, the tapered convex surface 40 on the outer circumference of the foregoing conical clutch body 38 is tightly engaged with the tapered concave conical clutch surface 30 of the recess of the flywheel 32 which is free to rotate on the needle bearings 34 and the needle thrust bearings 36 on the flanged ring base 28 which is secured at the rear end of the outer case 26 of the tip spindle 16, whereby the said flywheel 32 rotates around the outer circumference of the said flanged ring base 28 being driven by the conical clutch body 38. Since the conical clutch body 38 is connected with the main spindle 14 by the spline 18 and the main and tip spindles 14 and 16 are connected by the coupling 24 between the splines 18 and 20, the rotational inertia of the spindle system made up of the main spindle 14 and the tip spindle 16 will be large due to the addition to the system of the rotational inertia of the flywheel 32 itself.

For carrying out a light cutting such as tapping work, the pressure within the small space 82 is relieved by the control means (not shown) actuating the change-over valve of the hydraulic fluid source so that the conical clutch body 38, the spacer 50, the ball bearing 56 and the sliding piece 52 are together pushed back in the direction of the arrow Q by the resilient force of the compression spring 46, the sliding piece moving into the space 62, to disengage the tapered concave conical clutch concave surface 30 of the flywheel 32 and the tapered convex surface 40 of the conical clutch body 38 and disconnect the flywheel 32 from the spindle, whereby the rotational inertia of the spindle system is reduced so that is is suitable for the light cutting, such as tapping and the like and, moreover, it is suitable to such work in which a reversal of the direction of rotation is often required to provide positive and a negative rotation of the spindle. Moreover, for a drilling of a small diameter hole and the like, the light cutting operation is suitable because the speed changing gear 94 can be shifted in the direction of the arrow Q, that is, in the direction to provide high speed rotation, by the actuation of the speed changing cylinder 98 and, also, because the flywheel 32 is disconnected from the spindle.

In the present invention the flywheel freely rotatably mounted on the spindle of the machining center is easily connected with or disconnected from the spindle by the actuation of the clutch means which is disposed on the spindle adjacent to the flywheel and operated under the control of the control means and the inertia of the spindle system can be changed so that versatile cutting can be performed by the spindle, such as heavy cutting like milling work, light cutting like tapping work and operations in which positive and the negative rotations are often involved, therefore, the economic effectiveness is extremely great due to the versatile types of cutting work which can be performed, the shortening of the idle time of the machine, and the saving of electricity. Further, since the mechanism is very simple the machining center including the present invention, can be manufactured at a relatively low cost.

What is claimed is:

1. In combination, a spindle means for a machining center and having a main spindle and a tip spindle which are axially aligned and which have opposed splined ends and a coupling engaging the splined ends of the spindles for connecting the spindles, a flywheel freely rotatably mounted on said spindle means for rotation around said spindle means, said flywheel having a tapered concave conical clutch surface on one end thereof, a conical clutch body slidably mounted on one of said splined ends and having a tapered convex conical clutch surface engageable in mating engagement with the concave clutch surface on said flywheel, spring means connected between said coupling and said clutch body urging said clutch body away from said flywheel, and clutch actuating means connected to said clutch body for sliding said clutch body along said splined end for bringing the tapered conical clutch surface thereon into the tight clutching engagement with the clutch surface on said flywheel.

2. The combination as claimed in claim 1 in which said clutch actuating means is a hydraulic actuating means.

3. The combination as claimed in claim 2 in which said flywheel is rotatably mounted around said tip spindle, and said conical clutch body is slidably mounted on the splined end of said main spindle, and said actuating means comprises a spacer loosely fitted on said main spindle adjacent said conical clutch body and having the end toward said tip spindle abutting the conical clutch body and having a step at the other end thereof, a ball bearing around said main spindle having an outer casing with which the step on said spacer is engaged, a sliding piece slidable on said main spindle and having the end toward said tip spindle engaged with the inner casing of said ball bearing, and hydraulic means for sliding said sliding piece toward said tip spindle.

4. The combination as claimed in claim 3 in which said sliding piece has a wide ring holding portion projecting from the outer circumferential surface thereof, and said sliding piece has sealing means on the outer peripheral surface of said ring holding portion and the portion of said sliding piece toward the base spindle end of said spindle means, and said hydraulic means further comprises a cylinder around said sliding piece having surfaces engaged by said sealing means and defining a hydraulic fluid receiving space between said sliding piece and said cylinder and a hydraulic fluid passage in said cylinder opening into the space between said sealing means, for supplying hydraulic fluid under pressure to said receiving space.

5. The combination as claimed in claim 4 further comprising a flange on said main spindle spaced from the end of the portion of said sliding piece toward the base spindle end of the spindle means, for providing a space to accomodate movement of the sliding piece away from said coupling.

6. The combination as claimed in claim 1 in which said tip spindle has an outer case therearound, a flanged ring positioned around said tip spindle having the flange secured to said outer case, and a needle thrust bearing between said flywheel and the flange portion of said flanged ring and a needle bearing between said flywheel and the ring portion of said flanged ring.

* * * * *